(12) United States Patent
Ferullo

(10) Patent No.: US 6,926,500 B2
(45) Date of Patent: Aug. 9, 2005

(54) FLUID INERTIA DRAG DAMPER FOR ROTARY WING AIRCRAFT ROTOR

(75) Inventor: David Ferullo, Saint Mitre les Remparts (FR)

(73) Assignee: Eurocopter, Cedex (FR)

( * ) Notice: Subject to any disclaimer, the term of this patent is extended or adjusted under 35 U.S.C. 154(b) by 427 days.

(21) Appl. No.: 10/186,830

(22) Filed: Jul. 1, 2002

(65) Prior Publication Data
US 2003/0012650 A1 Jan. 16, 2003

(30) Foreign Application Priority Data
Jul. 4, 2001 (FR) .......................................... 01 08884

(51) Int. Cl.$^7$ .............................................. B64C 21/51
(52) U.S. Cl. ...................... 416/107; 416/140; 416/500; 188/267.1; 188/312; 188/316; 188/318
(58) Field of Search ................ 416/140, 106, 416/107, 134 A, 500; 244/17.11; 188/312, 316, 318, 267.1; 267/226

(56) References Cited

U.S. PATENT DOCUMENTS

| | | | | |
|---|---|---|---|---|
| 2,667,237 A | * | 1/1954 | Rabinow | .................... 188/267 |
| 2,820,471 A | * | 1/1958 | Crowell | .................... 416/107 |
| 3,212,584 A | * | 10/1965 | Young | .................... 416/106 |
| 3,638,885 A | | 2/1972 | Reed | |
| 3,972,396 A | | 8/1976 | Bochnak | |
| 4,084,668 A | * | 4/1978 | Rybicki | .................... 188/312 |
| 4,105,365 A | * | 8/1978 | Ferris et al. | ................ 416/107 |
| 4,304,525 A | | 12/1981 | Mouille | |
| 4,407,633 A | | 10/1983 | Mouille | |
| 4,556,365 A | | 12/1985 | Mouille et al. | |
| 4,695,226 A | * | 9/1987 | Marchitto et al. | .......... 416/106 |
| 4,732,540 A | | 3/1988 | Mouille et al. | |
| 5,337,864 A | | 8/1994 | Sjoestroem | |
| 5,732,905 A | | 3/1998 | Krysinski | |
| 6,676,074 B2 | * | 1/2004 | Zoppitelli et al. | .......... 416/106 |

FOREIGN PATENT DOCUMENTS

| | | |
|---|---|---|
| EP | 0 183 039 | 6/1986 |
| EP | 1 130 280 | 9/2001 |
| FR | 2 737 271 | 1/1997 |
| GB | 1 333 246 | 10/1973 |
| GB | 2 111 171 | 6/1983 |

* cited by examiner

Primary Examiner—Christopher Verdier
(74) Attorney, Agent, or Firm—Sturm & Fix LLP

(57) ABSTRACT

A drag damper for use on a rotary-wing aircraft rotor comprises a body defining two variable volume chambers linked by a piston. The chambers filled with fluid in the damper are connected by a restrictor port in the piston or between the latter and the body, and via a channel of great length and small cross-section compared with the cross-section of the body, in which elastic means bear against and load the piston-rod assembly towards a neutral position, the anti-resonance frequency of the damper being matched substantially to the nominal rotation frequency of the rotor, and the restrictor port providing effective damping at the natural frequency ($\omega\delta$) of the blades in drag, differing by construction from the rotor frequency ($\Omega$).

10 Claims, 4 Drawing Sheets

FLUID INERTIA DRAG DAMPER FOR ROTARY WING AIRCRAFT ROTOR

BACKGROUND OF THE INVENTION

The invention relates to a drag damper designed to be fitted between the hub of a rotary-wing aircraft rotor and a flapping mass, which comprises one of the blades of the rotor and a device connecting this blade to the hub so as to damp the angular drag movements of said flapping mass with respect to the hub, i.e. the angular deflections of the blade, and more globally of the corresponding flapping mass, about their drag axis which is substantially parallel to the axis of rotation of the rotor;

The rotor is more particularly a helicopter main rotor subject to the instability phenomena known as "ground resonance" and "air resonance", although a conventional tail rotor may also be equipped with drag dampers according to the invention.

On rotors of the hinged type, the device connecting a blade to the hub may be arranged as a means of securing the blade and hinging it to the hub, when the blade is connected by its root, possibly in the form of a fork, to the hub, or as a device which is substantially radial (relative to the rotor axis) generally termed a cuff, and fitted with yokes at the ends to be connected to the blade root on the one hand and on the other to means of securing and hinging, such as a spherical laminated stop, itself connecting it to the hub, while on rotors of the semi-rigid type, this connecting device may be a flexible torsion arm, at the blade root, and surrounded by a torsionally rigid cuff integral with the blade root for controlling the blade in pitch, which is connected and hinged to the hub by this flexible torsion arm.

Numerous different embodiments of drag dampers are known, particularly dampers which are hydraulic, hydro-pneumatic, laminated with at least one layer of visco-elastic material stressed between two rigid fittings, or comprising combinations of these different means, these drag dampers comprising means of elastic return of defined stiffness and damping, when they are fitted to helicopter main rotors, to combat the resonance phenomena mentioned above.

It is a well-known practice to design into helicopter rotor blades and therefore into the corresponding flapping masses a natural drag frequency, also termed first drag mode or natural drag mode, which is different from the nominal rotation frequency at which the rotor is designed to be driven.

More generally, to avoid in particular fatigue problems resulting from the dynamic stresses in the blades and the fuselage, and problems of vibration levels in the fuselage, it is essential to position correctly the natural frequencies of the blades in flapping, torsion and drag relative to the nominal rotation speed of the rotor and its harmonics (multiples).

This results from the fact that a helicopter rotor constitutes a powerful vibration generator. Because of the variable angles of incidence and speeds of rotor blades and also of helicopters, alternating loads of aerodynamic origin are developed notably in the blades of rotors, and give rise in the latter to stresses as well as reactions on the attachments, particularly of the blades to the hubs. From this there result alternating loads and moments on the rotor heads, and the development of high vibration and stress levels in fuselages. The response of each blade, the stresses to which this blade is subjected and the loads which this blade transmits to the hub at the centre of the rotor are all the greater as at least one natural frequency of the blade (in drag, flapping and torsion) is close to the rotation frequency $\Omega$ of the rotor or one of its harmonics $n\Omega$ (where n is a whole number).

The dynamic characteristics of the rotor blades are therefore chosen to obtain suitable dynamic matching by ensuring that their natural vibration frequencies in flapping, drag and torsion are correctly positioned relative to the nominal rotation frequency $\Omega$ of the rotor and its multiples $n\Omega$, which is why it is necessary to observe certain simple rules for positioning the frequencies, and in particular two essential rules, the first of which is to avoid positioning a natural vibration frequency in flapping, drag or torsion on or very close to a harmonic of the rotation speed $n\Omega$ (where $n \geq 1$), and the second to endeavour as far as possible to position only one of these three natural frequencies between two adjacent harmonics $n\Omega$ and $(n+1)\Omega$ of the rotation speed in order to avoid coupling.

In addition to these two essential rules, it is imperative to follow recommendations proper to each type of deformation in flapping, drag or torsion.

Concerning the recommendations relating particularly to the drag modes for hinged or semi-rigid (semi-hinged) rotors, the first drag mode (or natural drag frequency) is at the origin of "ground resonance" and "air resonance" problems due to coupling with modes of the helicopter structure.

On a rotor with blades hinged in drag, the angular frequency or pulsatance of the first drag mode is given by the expression:

$$\omega\delta = \Omega\left(\frac{e \cdot m\delta}{I\delta}\right)^{1/2}$$

where e is the drag eccentricity of each blade, $m\delta$ is the static moment of the flapping mass (blade+device connecting it to the hub) relative to the hinge (drag axis) and $I\delta$ is the inertia of the flapping mass relative to this drag hinge.

On a semi-rigid rotor, the first drag mode of a blade or flapping mass depends on the characteristics not only of the blade or flapping mass but also of the hub. The pulsatance of the first drag mode is then given by the expression:

$$\omega\delta = \Omega\left(\frac{e \cdot m\delta}{I\delta} + \frac{k\delta}{\Omega^2 I\delta}\right)^{1/2}$$

where $k\delta$ is the stiffness of the drag damper fitted between the blade or corresponding flapping mass and the hub of the rotor.

The positioning of the first drag mode of a blade or of the corresponding flapping mass depends upon the modes of the helicopter structure (fuselage mass, inertia, stiffness of the landing gear and of any tyres which may be fitted to it), these modes of the structure being generally determined by specific tests, adjustment of the first drag mode being obtained by altering the term $k\delta$ representing the stiffness of the drag damper.

As a general rule, as the upper limit of the first drag mode $\omega\delta$, a value close to three-quarters of the nominal rotation frequency $\Omega$ of the rotor is taken, so as not to introduce excessively high stresses in the blades of the rotors. One of the other two natural vibration frequencies (in flapping and in torsion) of the blade or flapping mass is placed between $\Omega$ and $2\Omega$, and the other, as far as possible, between $2\Omega$ and $3\Omega$.

For this reason, when the rotor is started up or stopped, and also at the end of a landing by the helicopter in autorotation, the instantaneous speed of rotation of the rotor intersects the resonance frequency in drag situated below the nominal speed. Because of this, and also because of the fairly large range of variations in rotor rotation speeds which are authorised for helicopters in flight, it is necessary to increase damping at the natural vibration frequencies of the blades in drag, and possibly to reduce this natural frequency by means of drag dampers, which is the reason why these dampers are also termed frequency adapters, the aim being that the blades should be sufficiently damped in drag to avoid going into resonance.

The invention relates more specifically to a drag damper of the general type comprising a tubular damper body in which a piston moving integrally with a damper rod and slidable axially is fitted, and in the damper body delimits two opposing variable volume working chambers, filled with a fluid of which volumes are transferred, by restriction of the fluid by at least one flow-restriction port arranged between the piston and the body and/or in the piston, between the working chambers when the piston moves in the damper body, upon which elastic means bear and load the piston and/or the rod so as to return the rod-piston assembly towards a neutral position in the body.

A drag damper of this kind, known in particular from FR 2 063 969, may be hinged on the one hand to a fixed point on the hub or on a bracket connected to the rotor hub, by means connecting the body or one end, external to said body, of the damper rod and on the other to a fixed point on the corresponding flapping mass, at the blade root of this flapping mass or on a device connecting this blade to the hub, by means connecting the end of the rod external to the body or the damper body respectively.

As the hinging point of one end of the drag damper on the hub or a bracket fixed to the hub is situated between the blade on which the drag damper is hinged at its other end and an adjacent blade, the stiffness of the damper introduces an equivalent angular stiffness, opposed to the angular deflections of the blade relative to the hub about its drag axis. It is thus possible to increase the natural frequency of the blades in drag to escape from the two resonance phenomena mentioned above, with additional damping at the natural drag frequency $\omega\delta$ of the blade when the phenomena of air and ground resonance occur.

However, it is known these phenomena rarely appear during the life of a helicopter. Most of the time, the drag dampers are subject to forced excitation at the rotation frequency $\Omega$ of the rotor, on which the drag dampers dissipate energy to no purpose.

The mean power dissipated in a drag damper of a rotor can be expressed by the following relation: $Pd = \pi \cdot K'' \cdot f \cdot Xe^2$, where $K''$ is the dissipative stiffness of the damper, f the frequency of the movement applied to the damper (axial movement of the rod-piston assembly in the cylinder) and Xe is the movement of said rod-piston assembly associated with frequency f.

For example, for drag dampers of the type presented above fitted to a four-bladed main rotor of a helicopter with a weight of about 8 to 10 tonnes, a comparison of the energy dissipated on the forced excitation at the rotation frequency $\Omega$ with that which is dissipated on the natural frequency in drag $\omega\delta$ of the blades gives the following results.

For the same dissipative stiffness $K''$ of 400 daN/mm, the forced excitation at $\Omega$ with a frequency f of 4.5 Hz corresponds to an associated displacement Xe of 4 mm, that is to say a dissipated power of 900 W, whereas for the natural drag mode $\omega\delta$ at a frequency f of 2 Hz, causing an associated displacement Xe of 1 mm, there corresponds a dissipated power of 30 W.

Each drag damper therefore dissipates 97% of its energy on forced excitation at $\Omega$. Under these conditions of use, this energy is dissipated to no purpose, which entails substantial component fatigue, not only of the drag damper but of the means connecting it to the hub and to the flapping mass, and wasted weight due to oversizing of these parts.

On the helicopter with a weight of about 8 to 10 t considered, the forces applied to the drag dampers upon forced excitation at $\Omega$ are very high, which may cause incidents in service such as cracks in the yokes connecting the drag dampers to the flapping masses, damage to the drag damper spindles at the end where there are connected to the hub and also damage to the fittings connecting the drag dampers to the hub, and rapid deterioration of the ball joints used in these connection devices.

Moreover, FR 2 737 271 makes known a damper which senses acceleration and can be used in numerous applications in which it is necessary to damp elastic systems, and particularly as a damper for suspension systems, shock and yaw control, in transport and industry.

A damper of this kind comprises a tubular body in which a piston moving integrally with a damper rod and slidable axially is fitted, and in the body delimits two opposing variable volume working chambers connected to each other by at least one bypass channel, the length of which is very much greater than a main dimension of its cross-section, which is itself very much smaller than the cross-section of the body, a fluid filling at least the two working chambers in the body and the bypass channel, which can be made in the wall of the body, or in the piston, having the form of a spiral, helix or one or more concentric arcs of circle. When the piston is moved in the body, fluid is expelled and moves from one working chamber to the other using the bypass channel. By calculation, taking account of the law of conservation of fluid flows, the force to which the piston is subjected and accelerations of the piston on the one hand and of the column of fluid in the bypass channel on the other, it can be shown that the force to which the piston is subjected is proportional to the virtual fluid mass, similar to inertia, which can be maximised by adjusting the mass per unit volume of the fluid, the length of the bypass channel and above all the ratio between the cross-section of the body and the cross-section of the bypass channel. As viscous damping increases with the reduction in the cross-section and increase in the length of the bypass channel, choice of a low-viscosity fluid is indicated if the function of locking the rod-piston assembly in the cylinder by fluid inertia is to be favoured above the viscous damping function.

Moreover, EP 0 183 039 and GB 2 111 171 make known the practice of adjusting the damping force of a hydraulic damper of conventional type by filling its working chambers with an electro-rheological fluid circulating in a bypass channel connecting the two working chambers and subjected, in this bypass channel, to a variable electrostatic field enabling the viscosity of the fluid to be varied according to the signals from detectors such as velocity, acceleration, load detectors etc.

SUMMARY OF THE INVENTION

The idea underlying the invention is to propose a drag damper for helicopter rotor blades enabling the dynamic component at the rotation frequency $\Omega$ of the rotor to be eliminated in the damper by employing the principle of the fluid inertia damper according to FR 2 737 271, and to provide damping to the drag movement of the blades only at the natural frequency in drag $\omega\delta$, with the aim of improving the behaviour in service of all of the components constituting the damper and of the components connecting the damper to the hub on the one hand and on the other to the flapping mass, at the same time enabling the weight of the drag damper to be reduced.

To this end, the drag damper according to the invention is a drag damper as known from FR 2 063 969, and comprising:

a tubular damper body closed by two end faces, a piston slidable axially fitted in the body and delimiting in and with said body two opposing variable volume working chambers, a rod moving integrally with the piston and passing substantially axially through at least one end face of the body, a spring bias acting on the rod and/or the piston and bearing on the body, and tending to return said rod-piston assembly to a neutral position in the body, said body and said rod each comprising a connector for connecting respectively to one of the two components which are the rotor hub and said flapping mass, a fluid filling at least the two working chambers in the body, and at least one restriction port made in the piston and/or between the piston and the body, and restricting fluid passing from one working chamber to the other when the piston is moved in the body, wherein the drag damper further comprises at least one bypass channel linking the two working chambers and filled with fluid, the length of said bypass channel being greater than a main dimension of its cross-section, which is itself smaller than the cross-section of the body, the body and the bypass channel having dimensional characteristics and said fluid having physical characteristics such that the damper has an anti-resonance frequency $\omega a$ substantially equal to the rotation frequency $\Omega$ of the rotor, so as to filter the $\Omega$ dynamic component in the loads applied to the damper, and wherein said at least one restriction port is calibrated so as to dampen appreciably the relative movements of the rod-piston assembly and of the damper body at a frequency which is substantially equal to the natural drag frequency $\omega\delta$ of the flapping mass.

The drag damper according to the invention has the advantage of using the principle of the fluid inertia damper to filter or eliminate the $\Omega$ dynamic component in the loads it applies, by setting its anti-resonance frequency $\omega a$ to the rotation frequency $\Omega$ of the rotor, while providing damping in the natural drag mode of the blades at $\omega\delta$, to combat the problems of air and ground resonance, without degrading the filtering of the $\Omega$ component. By the anti-resonance frequency $\omega a$ of the drag damper is meant the frequency for which the force transmitted by a blade to the hub via the damper and the corresponding relative movements between the rod-piston assembly and the damper body are minimal.

In an advantageously simple mode of embodiment, when the bypass channel of length Lc has a constant cross-section sc, the damper body has a cross-section Sa, the spring bias has a stiffness k and the fluid has a mass per unit volume $\rho$, the anti-resonance frequency $\omega a$ of the damper, substantially matched to the frequency of rotation $\Omega$ of the rotor, is expressed as a function of the square root substantially of the ratio of the stiffness k of the spring bias to a virtual fluid mass Ma such that Ma=$\rho$Lc Sa$^2$/sc. The relevance of such an embodiment is that its anti-resonance frequency, which is easily calculated, is independent of the mass of the blade (of the flapping mass) and of the hub, and is linked solely to the geometry of the drag damper, for a given mass per unit volume of the fluid, and therefore for a given fluid.

In order to match the performance of the drag damper to helicopters on which the main rotors have a variable speed of rotation, it is also advantageous that the cross-section sc of at least part of the bypass channel should be variable and controlled by a control device according to at least one rotor rotation speed signal received by said control device, which controls the variation in said cross-section sc so as substantially to match the anti-resonance frequency $\omega a$ of the damper to the rotation frequency $\Omega$ of the rotor. In the case of a bypass channel of circular cross-section, its diameter and thus its cross-section may be controlled by such an active control device.

According to the invention, the bypass channel may be inside the damper body. In this case, this bypass channel can be made at least partially inside the piston, and/or said spring bias may comprise at least one spring in which at least a part of said bypass channel is made. Different spring structures may be used in order to constitute both the spring bias providing stiffness, and means in which parts of the bypass channel are made, for example metal helical or coil springs, conical or cylindrical springs.

As a variant, the bypass channel may be at least partially external to said damper body. This variant lends itself more favourably to controlling and monitoring the cross-section of at least part of said bypass channel, when this cross-section is variable and adjustable, as indicated above.

In order to ensure optimum restriction of the fluid at the natural drag frequency $\omega\delta$, the piston may be drilled with several restriction ports calibrated at different cross-sections.

Finally, to reduce the dissipation forces linked to pressure losses and to viscous damping forces, which are unwanted forces limiting total compensation of the stiffness forces (elastic forces transmitted by the springs) by the hydraulic force at the anti-resonance frequency, it is also advantageous to be able to vary the viscosity of fluid and, to this end, and as known from EP 0 183 039 and GB 2 111 171 quoted above, the fluid used in the drag damper may be an electro-rheological fluid, the variable viscosity of which is controlled by the control of an electric and/or magnetic field to which at least part of said fluid is subjected.

BRIEF DESCRIPTION OF THE DRAWINGS

Other characteristics and advantages of the invention will emerge from the description given below of examples, though not limited to these, of embodiments described with reference to the attached drawings in which.

DETAILED DESCRIPTION OF THE INVENTION

Figure 1:
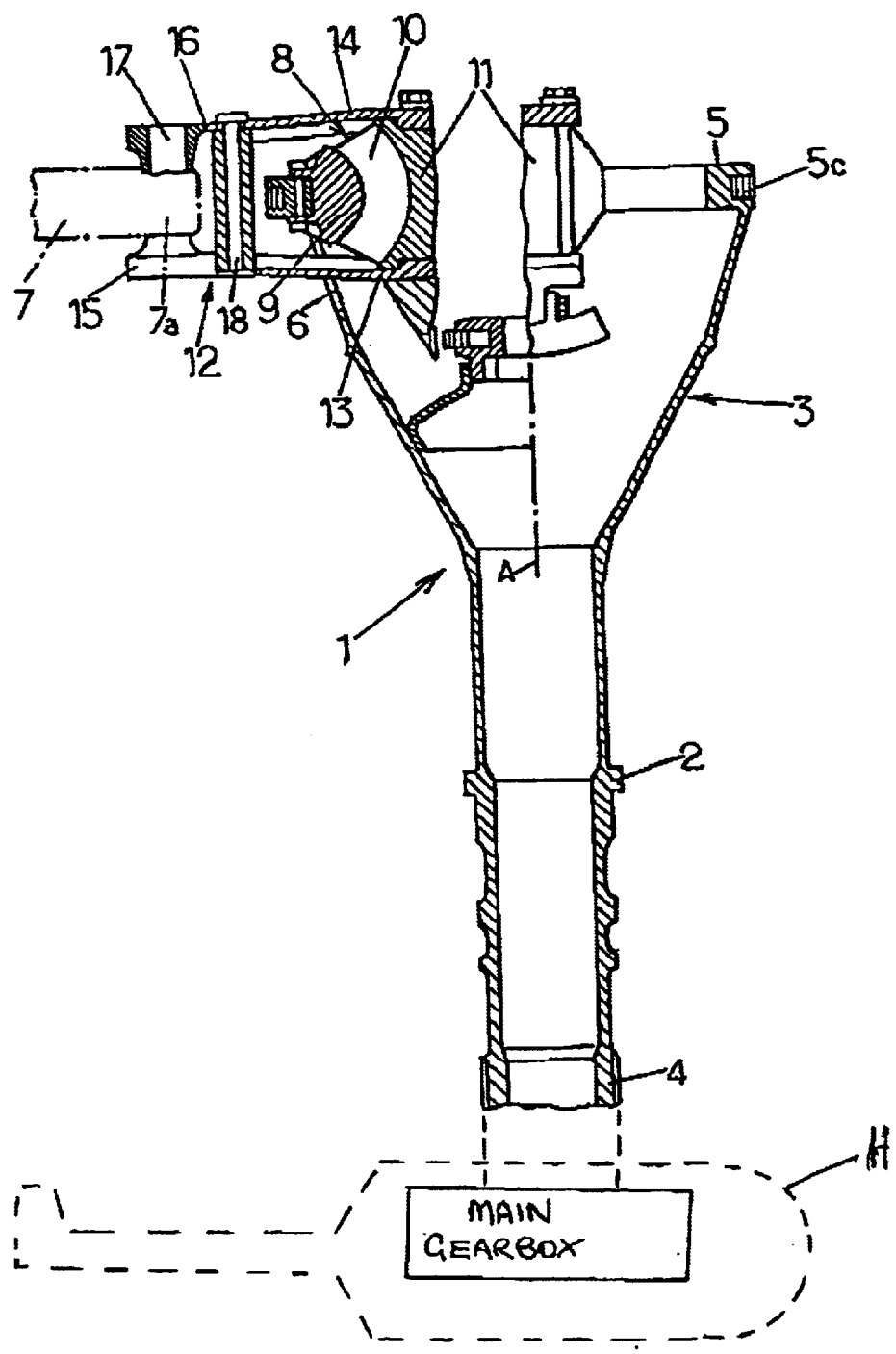
FIG. 1 is a schematic view in axial half-section on the left-hand half-view and in offset section on the right-hand half-view, for a four-bladed helicopter main rotor head.
Figure 2:
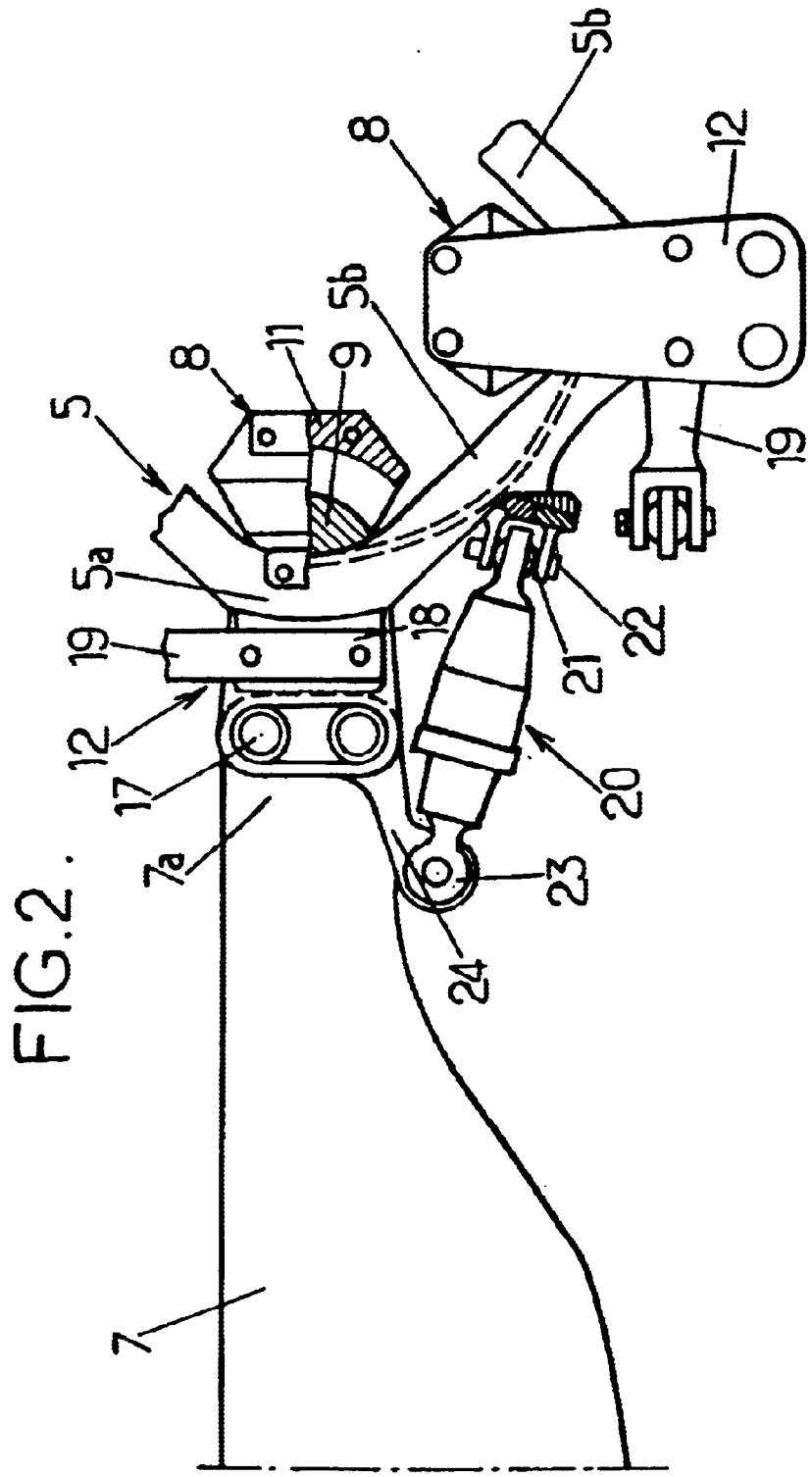
FIG. 2 is a partial schematic view partly in section and partly in plan of the rotor head in FIG. 1, with a drag damper fitted between each of the four rotor blades and the hub.
Figure 5:
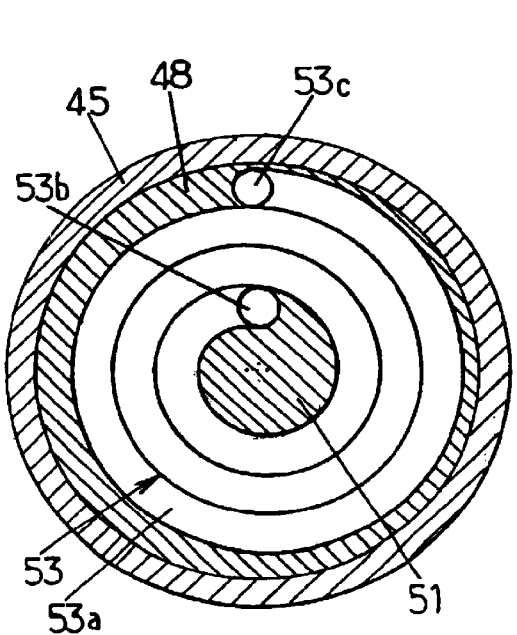
FIGS. 4 and 5 are schematic views respectively in axial and radial cross-section of a first example of drag damper operating as explained with reference to FIG. 3.
Figure 4:
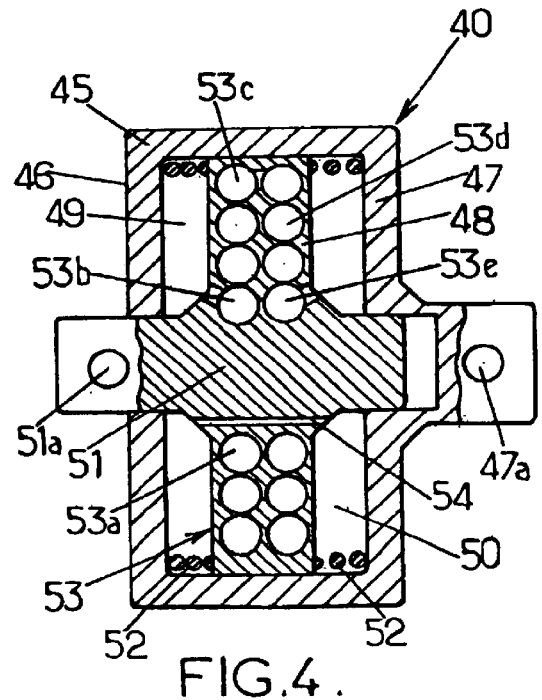

FIGS. 1 and 2 show schematically the head of a four-bladed helicopter main rotor substantially as described in EP 0 213 016 with reference to FIGS. 4 and 5 in that document, to which reference may advantageously be made for further information.

It will be recalled that this rotor head comprises a one-piece tubular mast-hub 1, the lower substantially cylindrical part of which forms a mast 2 with a base 4 designed to be connected in rotation to a main gearbox of the helicopter H (shown schematically in phantom outline) to drive the rotor in rotation about the axis A of the mast-hub 1. The latter also comprises an upper part forming a hub 3, which is an extension of the mast 2 and has the general external shape substantially of a truncated cone hollowed out at the end opposite to the mast 2 as far as a reinforcement ring 5 which constitutes the upper free end, thickened locally on its periphery, of the hub 3. Radial (relative to axis A) openings 6, identical and equal in number to the number of rotor blades, are made in the portion of hub 3 which is directly adjacent the ring 5 and are regularly distributed in a circumferential direction over the periphery of this portion of hub 3. Each opening 6 has a substantially half-moon or greatly rounded bean shape, the general concavity of which is facing the ring 5, which surrounds the opening in the upper end of the hub 3. This ring 5, the shape of which in plan (see FIG. 2) is that of a pseudo-regular polygon, with small sides 5a equal, rounded and convex alternating with large sides 5b equal, rectilinear and equal in number to the number of rotor blades, is reinforced by a composite belt 5c in a peripheral groove in the ring 5. Each of the openings 6 is made in the hub 3 respectively directly under one of the small sides 5a of the ring 5, these convex small sides 5a corresponding to the portions of the ring 5 to which are secured spherical laminated stops 8 housed in the opening in the upper end of the hub 3 and constituting the devices for securing and hinging the blades 7 to the mast-hub 1.

The spherical laminated stops 8 are well-known components, each hinging a blade 7 to the hub 3 about the three axes of flapping, drag and pitch change of the blade, which intersect at the pivoting point determined by the centre of rotation of the corresponding spherical laminated stop 8. Each stop 8 mainly comprises a central laminated part 10 constituted by an alternating stack of rigid layers, of metal for example, and of a visco-elastic material, such as a synthetic rubber, and in the form of segments of a sphere, this central laminated part being vulcanised between two rigid fittings 9, 11, of metal for example.

Each spherical laminated stop 8 is placed against the inner face of the ring 5 and is secured against the latter by its external radial fitting 9 shaped as a fork straddling the ring 5 at an opening 6 while its inner radial fitting 11, integral with the laminated central part 10 on the side opposite the outer fitting 9 is secured by bolting as spacers between the two branches 13 and 14 of an inner radial yoke of a connecting device 12, termed a cuff, connecting a blade 7 to the hub 3 via the corresponding spherical laminated stop 8. In this method of assembly, the lower branch 13 of the inner radial yoke 13–14 of the cuff 12 passes through the corresponding opening 6.

The blade 7 has its root 7a secured between the two branches 15 and 16 of an external radial yoke of the cuff 12 by two tubular pins 17, parallel with each other and substantially with the rotor axis A, and passing through aligned bores in the blade root 7a and the branches 15 and 16 of this outer yoke.

In the simple form of embodiment in FIGS. 1 and 2, the radial connecting cuff 12 comprises two radial plates arranged substantially one above the other, the lower plate embodying the lower branches 13 and 15 and the upper plate embodying the upper branches 14 and 16 respectively of the inner and outer yokes of the cuff 12, and these two plates have as a spacer between them the inner fitting 11 of the stop 8 and, outside the ring 5, by a spacer 18 onto which the two plates are bolted, and which supports a laterally projecting pitch change lever 19 for controlling the pitch of the corresponding blade 7.

Drag damping of each flapping mass constituted by a blade 7 and its cuff 12 connecting it to the hub 3, and the elastic return of this flapping mass to its neutral axis are provided by a device external to the mast-hub 1 and arranged laterally between the ring 5 of the hub 3 and this flapping mass. This device, termed a drag damper, an elastic drag return strut with built-in damping or even a frequency adapter is a device 20 arranged as a particular hydraulic damper the structure and mode of operation of which are described below with reference to FIGS. 3 to 6.

The drag damper 20 is coupled by a ball joint 21 at its inner end in an attachment yoke 22 fitted onto an outward radial projection from the ring 5, approximately in the middle of the large side 5b of this ring 5 which extends between the cuff 12 of the blade 7 considered and the cuff 12 of an adjacent blade 7 of the rotor.

At its outer end, the damper 20 is coupled by a ball joint 23 in a yoke formed between two fittings 24 which each form a single part with one of the two lower and upper plates of the connecting cuff 12, each fitting 24 extending both radially outwards and towards the trailing edge of the corresponding blade 7, starting from the outer radial end of the corresponding lower or upper plate.

Figure 3:
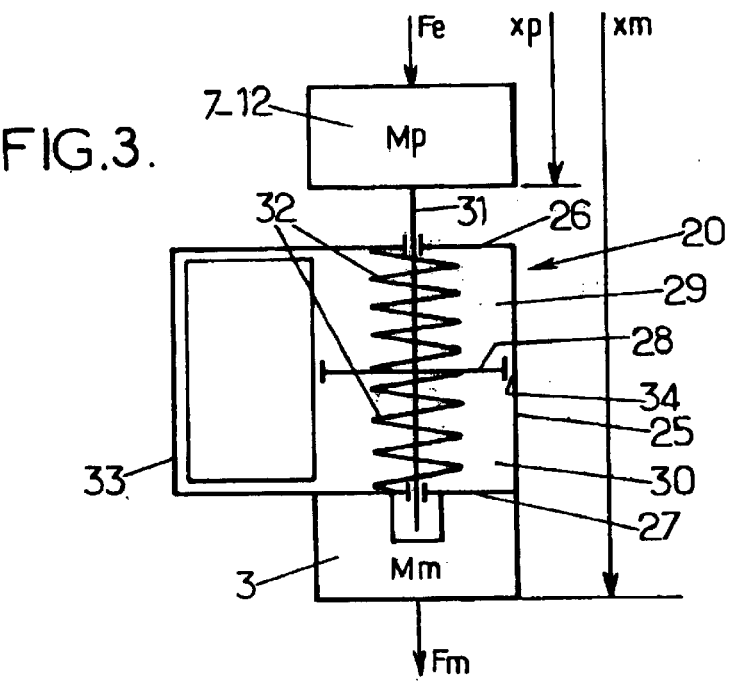
FIG. 3 is a schematic view of the assembly of a blade, a drag damper and the rotor hub, to explain the operation of the damper.

The drag damper 20 in FIG. 2 is represented schematically in FIG. 3, coupled between the hub 3, of mass Mm, by the end fitted with the ball joint 21 in FIG. 2, and the flapping mass constituted by the blade 7 and the cuff 12, and of mass Mp, by the ball joint 23 at its other end in FIG. 2.

The drag damper 20 comprises a cylindrical tubular body 25 of circular cross-section Sa, closed at its axial ends by two end faces 26 and 27, a piston 28 fitted and slidable axially in the body 25 and delimiting in this body 25, and with the latter and the end faces 26 and 27, two opposing variable volume working chambers 29 and 30, the piston 28 moving integrally with an axial rod 31 passing in a sealed manner through not only the end face 26, to be coupled by its outer free end to the cylinder 20, to the flapping mass 7–12, but also in this example, the other end face 27 coupled to the hub 3. The damper 20 also comprises two identical springs 32 housed in the chambers 29 and 30, each of which bears on the one hand against one of the end faces 26 and 27 respectively and on the other respectively against one of the two opposite faces of the piston 28, so that it loads the rod 31-piston 28 assembly so as to return this assembly to a neutral position in the body 25, by the springs 32 bearing on this closed body, and a bypass channel 33 permanently connects the two chambers 29 and 30, this channel having a length Lc which is very much greater than a main dimension, for example the diameter, of its constant cross-section sc, the latter being itself very much smaller (by about one order of magnitude) than the constant cross-section Sa of the body 25, and a fluid, which is a hydraulic oil, fills the two chambers 29 and 30 and also the channel 33, and is restricted by an annular calibrated restriction port 34 between the body 25 and the piston 28, when this piston 28 is moved axially in the body 25 by relative movements in drag of the flapping mass 7–12, connected to the rod 31, and of the hub 3, connected to the body 25.

In the case of an external excitation being applied to the flapping mass 7–12, and represented by the force Fe applied to this flapping mass in FIG. 3, if Fm is the force transmitted to the hub 3, via the drag damper 20, and if xp and xm represent the axial movements relative to a common origin on the axis of the damper 20, respectively of the flapping mass 7–12 and the hub 3, as indicated schematically in FIG. 3, application of the general theorems of mechanics gives the following relations (1) and (2) for the two masses Mp and Mm in translation:

for the blade $$Fe-Fm=Mp\ddot{x}p, \quad (1)$$

and for the hub $$Fm=Mm\ddot{x}m, \quad (2)$$

where $\ddot{x}$ represents the second derivative of the movement with respect to time, i.e. acceleration, so that $\ddot{x}p$ is the acceleration undergone by the flapping mass 7–12 and $\ddot{x}m$ is the acceleration undergone by the hub 3.

Additional equations are given by linking the internal forces to the degrees of freedom of the system. By the constitution of the damper 20, the force Fm transmitted to the hub 3 is the sum of the elastic return force of the springs 32 (each of which has a stiffness k/2), the forces of pressure transmitted by the fluid present in the body 25 of the damper 20 and of the viscous friction force Fh. Hence the relation (3):

$$Fm=-k(xm-xp)+Fh-c(\dot{x}m-\dot{x}p) \quad (3)$$

where c represents the coefficient of viscous damping and $\dot{x}$ the first derivative of the movement with respect to time, i.e. velocity. Moreover, we have the relation (4):

$$Fh=-(P1-P2)\,Sa, \quad (4)$$

where P1 et P2 are the pressures obtained respectively in chambers 29 and 30. Considering the mass of fluid in motion in the bypass channel 33 and acceleration of this fluid (the oil), we also have the relation (5):

$$(P1-P2)sc=-Mfc\,\ddot{x}fc, \quad (5)$$

where Mfc represents the mass of fluid in motion in the channel 33, i.e. Mfc=ρLc sc, where ρ is the mass per unit volume of the fluid and $\ddot{x}fc$ is the acceleration of the fluid moved in the channel 33.

The fluid inertia effect is introduced by the hydraulic force term Fh, since the relation of velocity to the passing of the fluid between the channel 33 and the body 25 leads to the following relation (6):

$$sc\dot{x}fc=Sa(\dot{x}m-\dot{x}p) \quad (6)$$

whence the relation (7):

$$Fh = -(P1-P2)Sa$$
$$= -\frac{\rho Lc S^2 a}{sc}(\ddot{x}m - \ddot{x}p) \quad (7)$$
$$= Ma(\ddot{x}p - \ddot{x}m) \quad \text{taking}$$

$$Ma = \rho Lc \frac{S^2 a}{sc}$$

which represents an apparent mass (or fluid inertia) which may be very much greater than the actual mass of the fluid Mf in motion.

As the movement xp of the flapping mass 7–12 is of the sinusoidal type of pulsatance ω, its acceleration $\ddot{x}p$ can be expressed in the form $\ddot{x}p=-\omega^2 xp$, which, by combining the expressions (1), (3) and (7), allows the movement equation to be obtained for the degree of freedom xp:

$$Mp\ddot{x}p+c(\dot{x}p-\dot{x}m)+(k-Ma\omega^2)(xp-xm)=Fe(\omega) \quad (8)$$

where Fe(ω) is the force applied to the flapping mass 7–12 at the frequency of the external excitation.

Similarly, as the movement xm of the hub 3 is of the sinusoidal type of pulsatance ω, its acceleration $\ddot{x}m$ can be expressed in the form $\ddot{x}m=-\omega^2 xm$ which, by combining expressions (2), (3) and (7) allows the movement equation to be obtained for the degree of freedom xm:

$$Mm\ddot{x}m+c(\dot{x}m-\dot{x}p)+(k-Ma\omega^2)(xm-xp)=0 \quad (9)$$

The effect of the fluid inertia is therefore expressed by the addition of a negative fluid stiffness Kf=−Ma ω², a function of the excitation pulsatance ω. The equivalent stiffness Keq of this system is therefore the sum of the two stiffness values combined in parallel and given by:

$$Keq=k-Ma\,\omega^2 \quad (10)$$

The anti-resonance frequency of such a drag damper 20, which is the frequency for which minimisation of the force Fm and of the movement xm at the hub 3 is obtained, is the frequency ωa for which the equivalent stiffness Keq is zero, and is therefore given by the following relation $$\omega a=(k/Ma)^{1/2}. \quad (11)$$

We thus obtain a drag damper 20 having an anti-resonance frequency ωa independent of the masses of the flapping mass 7–12 and of the hub 3, and linked solely to the geometry of the damper 20.

In the latter, the relevance of the bypass channel 33 is to create a high difference in dynamic pressure by causing a small fluid mass (of oil) to pass into this channel 33 of cross-section sc far smaller than the cross-section Sa of the body 25. This fluid inertia effect results from conservation of the fluid flow at the point of convergence, when fluid enters the channel 33 coming from the one of the two chambers 29 and 30 which is compressed by movement of the piston 28, and at the point of divergence where the fluid leaves the channel 33 to enter the one of the two chambers 30 and 29 where expansion is occurring. At the anti-resonance frequency ωa, the hydraulic force developed is used to compensate the elastic force transmitted by the springs 32.

Simultaneously, the dissipation forces connected with the pressure losses and with the viscous damping forces are unwanted forces which limit total compensation of the forces of stiffness by the hydraulic force at the anti-resonance frequency.

The drag damper 20 is therefore dimensioned, as regards the stiffness k of the two springs 32, the length Lc and the cross-section sc of the channel 33, and the cross-section Sa of the body 25, and the fluid (the oil) used has physical characteristics, particularly a mass per unit volume ρ, so that the anti-resonance frequency ωa of the damper 20 is set substantially at the nominal rotation frequency Ω of the rotor, of which it is known that it is different by design from the natural frequency in drag ωδ of the flapping mass 7–12.

At the same time, the cross-section through the restrictor port 32 between the piston 28 and the body 25 is calibrated so as to optimise the dissipative phenomena, i.e. to damp the drag mode sufficiently at the natural drag frequency ωδ of the flapping mass 7–12, without degrading the filtering of the Ω component.

In these conditions, the damper 20 filters the Ω dynamic component in the loads it applies, so that damping of the forced excitation at Ω is zero or practically zero, but on the other hand the restrictor port 34 provides substantial damping of the relative movements of the rod 31-piston 28 assembly and of the body 25 at a frequency which is substantially equal to the natural drag frequency ωδ of the flapping mass 7–12.

An example of dimensioning of the dampers 20 for the main rotor of a helicopter with a weight of the order of eight to ten tonnes leads to the following geometry: diameter of the body 25: Da=0.15 m, diameter of the channel 33: Dc=0.014 m, length of the channel 33: Lc=1.45 m, mass per unit volume and viscosity of the oil ρ=850 kg/m³ and ν=20·10$^{-6}$ m²/s, coefficient of pressure loss of the channel 33 equal to 3.4 for a desired stiffness of the damper 20, at the natural drag frequency ωδ, of 200 daN/mm, the anti-resonance frequency ωa and the rotor rotation frequency Ω being 30.6 rad/s.

Figure 7:
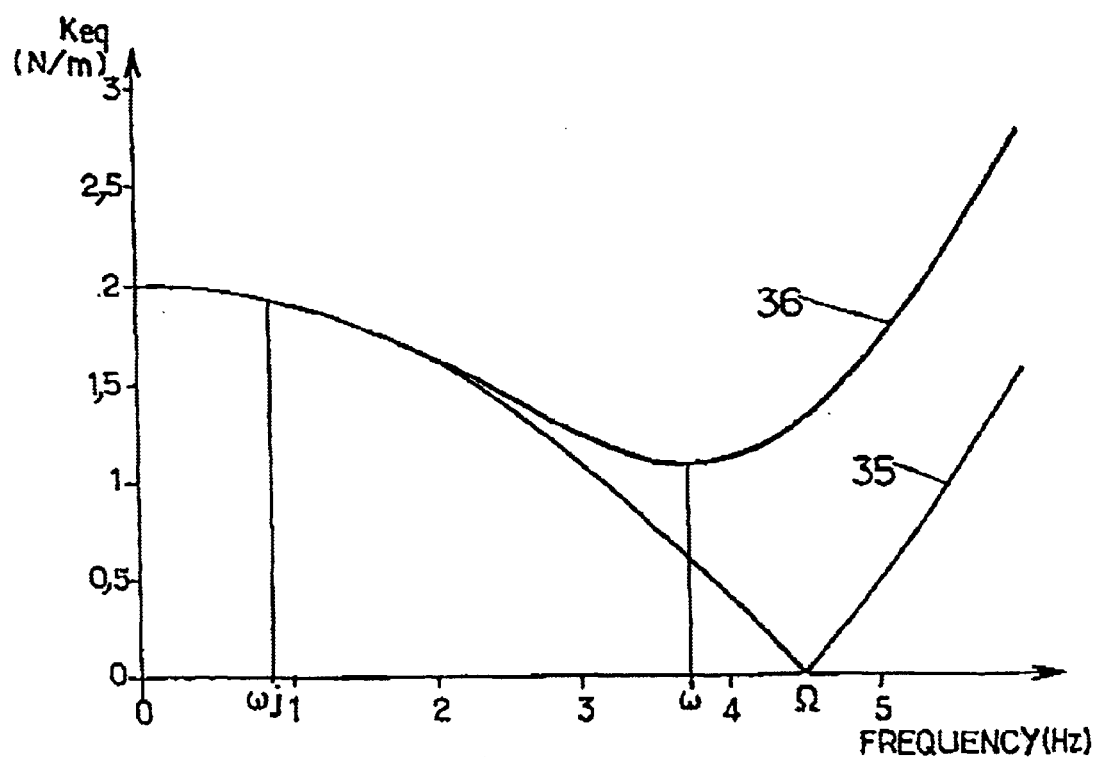
FIG. 7 shows two curves of the change in equivalent stiffness of the drag damper in FIG. 3 as a function of excitation frequency, respectively without pressure loss and with pressure loss.

Disregarding pressure losses, the drag damper 20 defined above provides optimum performance, the Ω forced excitation is not damped, there is maximum gain, and the fluid undergoes no restriction. The equivalent stiffness Keq of such a fluid inertia drag damper, as a function of frequency, is shown in FIG. 7, in which the curve 35 corresponds to an ideal device without pressure losses. The curve 35 shows that the damper eliminates the damping loads at the rotation frequency of the rotor Ω, equal to the anti-resonance frequency ωa, and works only on the damping of the drag mode of the blades at ωδ, which is the natural drag frequency of the blades. At this frequency ωδ, the damper 20 ensures an equivalent stiffness practically equal to the stiffness of the damper 20, i.e. of the order of 200 daN/mm. Damping at ωδ is obtained by restriction of the fluid in the body 25, in this example via the annular restrictor port between the piston 28 and this body 25.

In fact, the pressure losses reduce the effectiveness of the system at frequency Ω, and when all of the pressure losses and the turbulent nature of the flow are taken into account, the performance of the drag damper 20 corresponds to the curve 36 in FIG. 7, for which the equivalent stiffness Keq is minimal (but not zero) for an anti-resonance frequency ωa slightly less than Ω, damping at the natural drag frequency of the blades ωδ remaining effective.

Despite the turbulent nature of the flow and allowance for all of the pressure losses, the fluid inertia drag damper 20 provides a reduction of about 40% to about 50% in the dynamic stresses at Ω compared with a conventional drag damper, which is still highly advantageous.

FIGS. 4 and 5 show schematically a first example of embodiment of such a fluid inertia drag damper 40, comprising a cylindrical tubular body 45 closed by two end faces 46 and 47, a piston 48 slidable axially and, in this example, with sealing in the body 45 and being integral with an axial rod 51 also slidable with sealing in the end faces 46 and 47, and one end of which external to the body 45 comprises a ball end 51a for hinging to a rotor blade or to a device connecting this blade to the rotor hub, while the end face 47 is integral with a ball end 47a for hinging to the body 45 on the rotor hub, two springs 52, identical and of a helical or coil type, each being housed respectively in one of the two working chambers 49 and 50 delimited by the piston 48 in the body 45, each spring 52 being guided by the body 45 and bearing respectively against one of the two end faces 46 and 47 at one end, and at the other, against the piston 48 to return the rod 51-piston 48 assembly to a neutral position in the body 45, the two chambers 49 and 50, filled with a fluid such as hydraulic oil, being in permanent communication with each other via a restrictor port 54 drilled in the base of the piston 48 and calibrated to obtain substantial damping at the natural drag frequency ωδ of the blade considered, this natural frequency ωδ being different by design from the nominal rotation frequency Ω of the rotor. This damper 40 also comprises a bypass channel of substantial length and small cross-section connecting the two chambers 49 and 50, the main difference compared with the schematic mode of embodiment in FIG. 3 being that this bypass channel 53 is internal to the body 45 and more precisely made inside the piston 48. This channel 53 is arranged in two radial adjacent spirals in the piston 48, one of which 53a diverges from a central end communicating via an inlet port 53b with the chamber 49 as far as its outer radial end communicating via an axial passage 53c with the outer radial end of the second spiral 53d which converges as far as its inner radial end which runs via an opening 53e into the other chamber 50 of the damper 40. The geometry of this damper 40 and the physical characteristics of the fluid used, in particular the lengths and cross-section of the channel 53, the cross-section of the body 45 and the mass per unit volume and viscosity of the oil used are such that the anti-resonance frequency of the system is close to the rotor rotation frequency Ω, as explained with reference to FIGS. 3 and 7.

Figure 6:
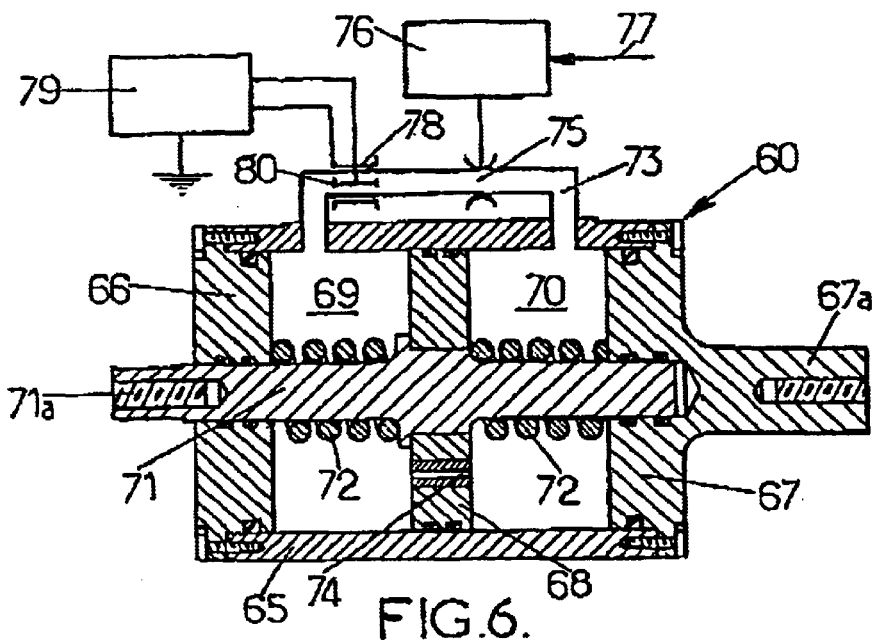
FIG. 6 is a schematic view in axial section of another example of a drag damper operating according to FIG. 3.

The example of embodiment in FIG. 6 differs from that in FIGS. 4 and 5 in that the fluid inertia drag damper 60 comprises a bypass channel 73 which, as in the schematic example in FIG. 3, is external to the damper body 65 closed with sealing by the end faces 66 and 67 added on and secured with screws, the end faces themselves having running through them, with sealing, the axial rod 71 moving integrally with the piston 68 slidable with sealing in the body 65. Another difference is that the two helical springs 72 are wound around the rod 71, the end external to the body 65 of which has a bore 71a for attachment of a ball end for hinging to the blade, while the end 67 is extended axially outwards by an end piece 67a having a bore for attaching a ball end for hinging to a hub. The permanent communication between the two working chambers 69 and 70 of the damper 60 is provided not only by the bypass channel 73 but also by one or more restrictor ports 74 drilled through the piston 68 and calibrated to produce substantial damping at the natural drag frequency ωδ of the blade, while the dimensional characteristics of the damper 60 and the physical characteristics of the oil which it contains are selected, particularly as regards the length and cross-section of the channel 73 and also the cross-section of the body 65, so that the anti-resonance frequency ωa of the assembly is as close as possible to the nominal rotation frequency Ω of the rotor.

As a variant, the piston 68 is drilled with several restrictor ports 74 calibrated at different cross-sections, in order to ensure optimum restriction of the oil at the natural drag frequency ωδ.

Also as a variant, the springs used to obtain the necessary stiffness may have different structures, particularly helical or coil springs, or springs which are cylindrical or conical, and in general of metal. In certain damper architectures, such as the one in FIGS. 4 and 5, the springs can be used to fulfil not only the stiffness function but also that of at least part of the bypass channel, by using hollow springs communicating with the channel which runs through the piston.

Also as a variant, and as shown schematically in FIG. 6, a part 75 of the bypass channel 73 may be of variable cross-section and controlled, in the form of an adjustable restriction, by a control device 76 which receives at 77 a rotor rotation speed signal, in order to control the variation in the cross-section of this portion 75 of the channel 73 so as to give real-time adjustment of the anti-resonance frequency o of the damper 60 at a variable speed of rotation $\Omega$ of the rotor. In this way, the performance of the drag damper is adapted to variable speed rotors.

In general, the geometry of the bypass channel may have complex forms, particularly of cross-section and variation of cross-section, in order to optimise pressure losses.

Moreover, to reduce the viscosity of the fluid used and thus reduce the effect of pressure losses, in order to optimise the operation of the drag damper, the fluid filling this damper may be an electro-rheological fluid, the variable viscosity of which is controlled by the control of an electrical and/or magnetic field to which at least part of the fluid is subjected. This can be embodied in the manner imparted in patents GB 2 111 171 and EP 0 183 039, to which reference should be made for further information on the matter, for example by arranging in a portion 78 of the channel 73, which is raised to a certain electrical potential by connection to a source generator 79, a cuff or plate 80 raised to a different electrical potential by connection to the same variable electrical field generator 79. It is thus possible to subject the fluid circulating in this portion 78 of the bypass channel 73 to an electrical field controlled by the control of the source generator 79, so that the viscosity of the fluid can be varied in an appropriate manner.

Of course, the fitting of such a fluid inertia drag damper is not limited to the type of main rotor according to FIGS. 1 and 2, and it can be fitted to other types of main rotors, particularly such as those described in FR 2 427 251, in which the hub is a plate or radial ring with axial recesses running through it, each of them housing means of connecting and hinging a blade to the hub, or FR 2 456 034, or FR 2 529 860, in which the hub body is a central sleeve which supports two radial plates spaced apart, between which are secured the means of connecting and hinging the blades to the hub, and the root of each blade may comprise a loop which surrounds the means of securing and hinging, themselves secured between the two plates of the hub.

The invention has now been described in detail for purposes of clarity of understanding. However, it will be appreciated that certain changes and modifications may be practised within the scope of the appended claims.

What is claimed is:

1. A drag damper designed to be fitted between a hub of a rotary-wing aircraft rotor and a flapping mass which comprises one of the blades of the rotor and a device for connecting said blade to the hub so as to damp the angular drag movements of said flapping mass relative to the hub, said flapping mass having by construction a natural drag frequency ($\omega\delta$) differing from the nominal rotation frequency ($\Omega$) at which the rotor is designed to be driven, the drag damper comprising:

a tubular damper body closed by two end faces, a piston fitted and slidable axially in the body and delimiting in and with said body two opposing variable volume working chambers, a rod moving integrally with the piston and passing substantially axially through at least one end face of the body, a spring bias acting on the rod and/or the piston and bearing on the body, and tending to return the rod-piston assembly towards a neutral position in the body, said body and said rod each comprising a connector for connecting respectively to one of two components which are the hub of the rotor and said flapping mass, a fluid filling at least the two working chambers in the body, and at least one restrictor port made in the piston and/or between the piston and the body, and restricting fluid passing from one working chamber to the other when the piston is moved in the body, wherein the drag damper further comprises at least one bypass channel of length (Lc) connecting the two working chambers and filled with fluid, the length (Lc) Of said bypass channel being greater than a main dimension of its cross-section (sc), which is itself smaller than the cross-section (Sa) of the body, with the body and the bypass channel having dimensional characteristics and said fluid having physical characteristics such that the damper has an anti-resonance frequency ($\omega a$) substantially equal to the rotation frequency ($\Omega$) of the rotor so as to filter the $\Omega$ dynamic component in damper loads, and wherein said at least one restrictor port is calibrated so as to dampen the relative movements of the rod-piston assembly and of the damper body at a frequency which is substantially equal to the natural drag frequency ($\omega\delta$) of the flapping mass.

2. A drag damper according to claim 1, wherein the spring bias has a stiffness k, and the fluid has a mass per unit volume $\rho$, such that said anti-resonance frequency ($\omega a$) of the damper, substantially matched to the rotation frequency ($\Omega$) of the rotor, is expressed as a function of the square root substantially of the ratio of the stiffness k of the spring bias to a virtual fluid mass Ma such that $Ma = \rho Lc\ Sa^2/sc$, when the cross-section (sc) of the bypass channel is constant.

3. A drag damper according to claim 1, wherein the cross-section (sc) of at least part of the bypass channel is variable and controlled by a control device according to at last one rotor rotation speed signal, received by said control device, which controls the variation in said cross-section (Sc) so as substantially to match the anti-resonance frequency ($\omega a$) of the damper to the rotation frequency ($\Omega$) of the rotor.

4. A drag damper according to claim 1, wherein said bypass channel is internal to said damper body.

5. A drag damper according to claim 4, wherein said bypass channel is at least partly made inside the piston.

6. A drag damper according to claim 4, wherein said spring bias comprises at least one spring in which at least part of said bypass channel is made.

7. A drag damper according to claim 1, wherein said bypass channel is at least partly external to said damper body.

8. A drag damper according to claim 1, wherein the piston is drilled with several restrictor ports calibrated at different cross-sections.

9. A drag damper according to claim 1, wherein said fluid is an electrorheological fluid of which the variable viscosity is controlled with at least one of an electrical field and a magnetic field to which at least part of said fluid is subjected.

10. A rotary wing aircraft comprising:

a rotor hub;

at least two flapping masses each comprising one blade of a rotor and a device for connecting said one blade to the rotor hub, each flapping mass having by construction a natural drag frequency ($\omega\delta$) differing from a nominal rotation frequency at which the rotor is designed to be driven;

and at least two drag dampers each fitted between the rotor hub and a corresponding flapping mass so as to dampen angular drag movements of said flapping mass relative to the rotor hub, each drag damper comprising:
- a tubular damper body closed by two end faces,
- a piston fitted and slidable axially in the body and delimiting in and with said body two opposing variable volume working chambers,
- a rod moving integrally with the piston and passing substantially axially through at least one end face of the body,
- a spring bias acting on the rod and/or the piston and bearing on the body, and tending to return the rod-piston assembly towards a neutral position in the body,
- said body and said rod each comprising a connector for connecting respectively to one of two components which are the hub of the rotor and said flapping mass,
- a fluid filling at least the two working chambers in the body, and
- at least one restrictor port made in the piston and/or between the piston and the body, and restricting fluid passing from one working chamber to the other when the piston is moved in the body, wherein the drag damper further comprises at least one bypass channel of length (Lc) connecting the two working chambers and filled with fluid, the length (Lc) Of said bypass channel being greater than a main dimension of its cross-section (sc), which is itself smaller than the cross-section (Sa) of the body, with the body and the bypass channel having dimensional characteristics and said fluid having physical characteristics such that the damper has an anti-resonance frequency ($\omega a$) substantially equal to the rotation frequency ($\Omega$) of the rotor so as to filter the $\Omega$ dynamic component in damper loads, and wherein said at least one restrictor port is calibrated so as to dampen the relative movements of the rod-piston assembly and of the damper body at a frequency which is substantially equal to the natural drag frequency ($\omega\delta$) of the flapping mass.

\* \* \* \* \*